(12) United States Patent
Kotecha et al.

(10) Patent No.: US 10,237,798 B2
(45) Date of Patent: Mar. 19, 2019

(54) TRANSMISSION CONTROL PROTOCOL (TCP) THROUGHPUT OPTIMIZATION IN MOBILE WIRELESS NETWORKS

(71) Applicant: Verizon Patent and Licensing Inc., Arlington, VA (US)

(72) Inventors: Lalit R. Kotecha, San Ramon, CA (US); Jin Yang, Orinda, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 66 days.

(21) Appl. No.: 15/263,532

(22) Filed: Sep. 13, 2016

(65) Prior Publication Data

US 2016/0381614 A1    Dec. 29, 2016

Related U.S. Application Data

(63) Continuation of application No. 13/179,241, filed on Jul. 8, 2011, now Pat. No. 9,479,617.

(51) Int. Cl.
| | |
|---|---|
| *H04W 4/00* | (2018.01) |
| *H04W 36/16* | (2009.01) |
| *H04W 28/02* | (2009.01) |
| *H04L 12/801* | (2013.01) |
| *H04L 12/893* | (2013.01) |
| *H04L 12/807* | (2013.01) |
| *H04L 29/06* | (2006.01) |
| *H04W 36/02* | (2009.01) |

(52) U.S. Cl.
CPC ........... *H04W 36/16* (2013.01); *H04L 47/196* (2013.01); *H04L 47/27* (2013.01); *H04L 47/40* (2013.01); *H04L 69/163* (2013.01); *H04W 28/0231* (2013.01); *H04W 36/023* (2013.01)

(58) Field of Classification Search
CPC .. H04W 28/0231; H04L 47/196; H04L 47/40; H04L 47/27; H04L 36/16; H04L 67/163
USPC ........................................................ 370/334
See application file for complete search history.

(56) References Cited

U.S. PATENT DOCUMENTS

| | | | |
|---|---|---|---|
| 6,272,148 B1* | 8/2001 | Takagi | H04L 1/1858 370/469 |
| 8,379,515 B1 | 2/2013 | Mukerji | |
| 9,478,617 B2* | 10/2016 | Huang | H01L 29/1083 |
| 2002/0046264 A1 | 4/2002 | Dillon et al. | |
| 2003/0149785 A1* | 8/2003 | Gerla | H04L 29/06 709/232 |
| 2008/0089230 A1 | 4/2008 | Kootstra | |
| 2009/0168720 A1* | 7/2009 | Vinayakray-Jani | H04W 80/06 370/331 |
| 2009/0300211 A1* | 12/2009 | Gallagher | H04L 47/10 709/235 |
| 2010/0205310 A1 | 8/2010 | Altshuler et al. | |

(Continued)

*Primary Examiner* — Chi H Pham
*Assistant Examiner* — Fahmida S Chowdhury

(57) ABSTRACT

A device establishes a first transmission control protocol (TCP) connection with a client device associated with a wireless network, and establishes a second TCP connection with a server device associated with the wireless network. The device also provides a first TCP window size to the client device via the first TCP connection, and provides a second TCP window size to the server device via the second TCP connection, where the first TCP window size is different than the second TCP window size.

20 Claims, 8 Drawing Sheets

(56) References Cited

U.S. PATENT DOCUMENTS

2011/0164589 A1* 7/2011 Lee .................. H04W 36/02
                                              370/331
2011/0170521 A1* 7/2011 Wang ................ H04B 7/0617
                                              370/336
2011/0225285 A1* 9/2011 Patel ................. G06F 9/4856
                                              709/224

* cited by examiner

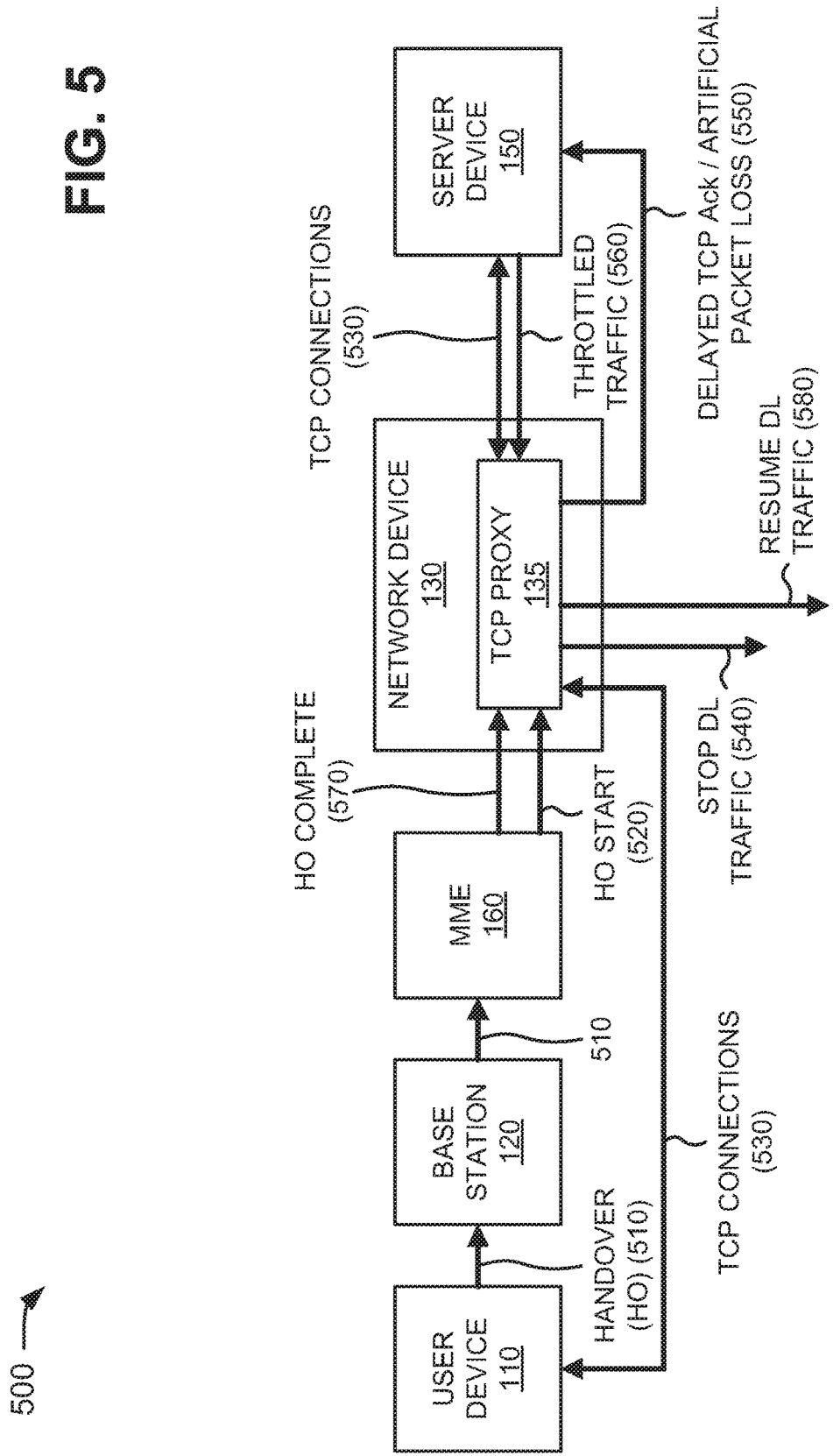

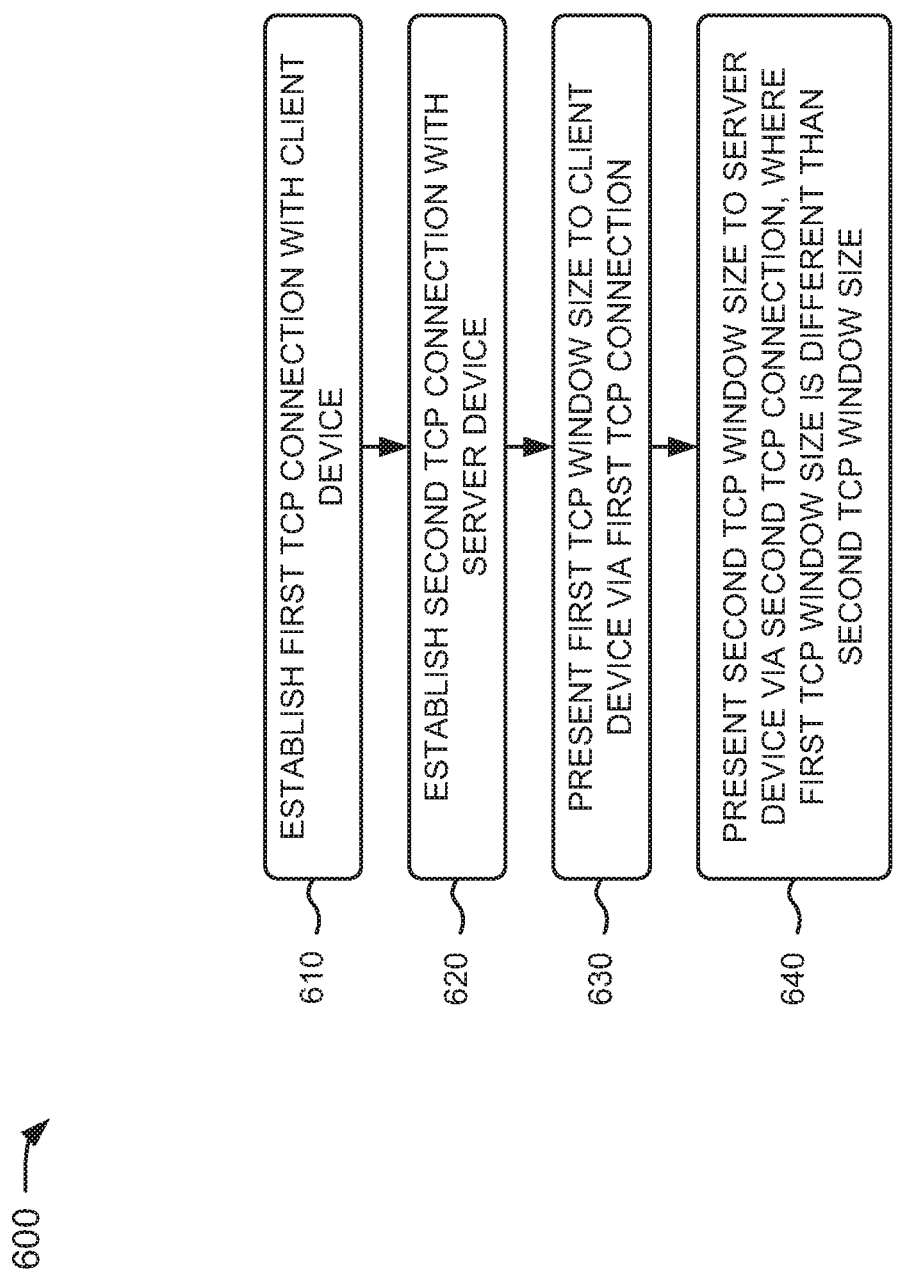

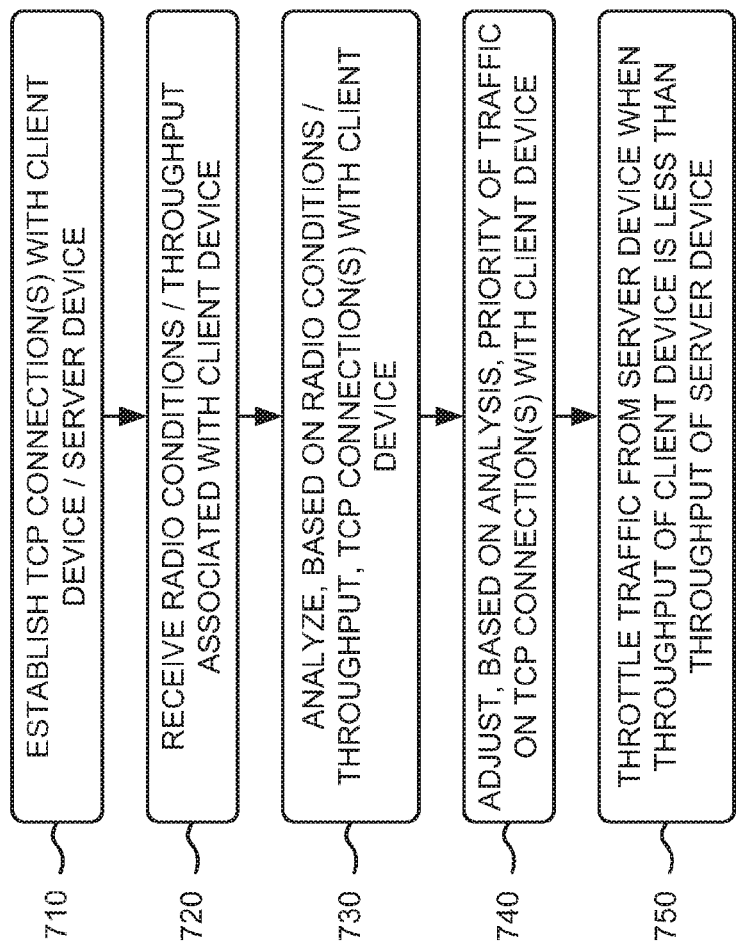

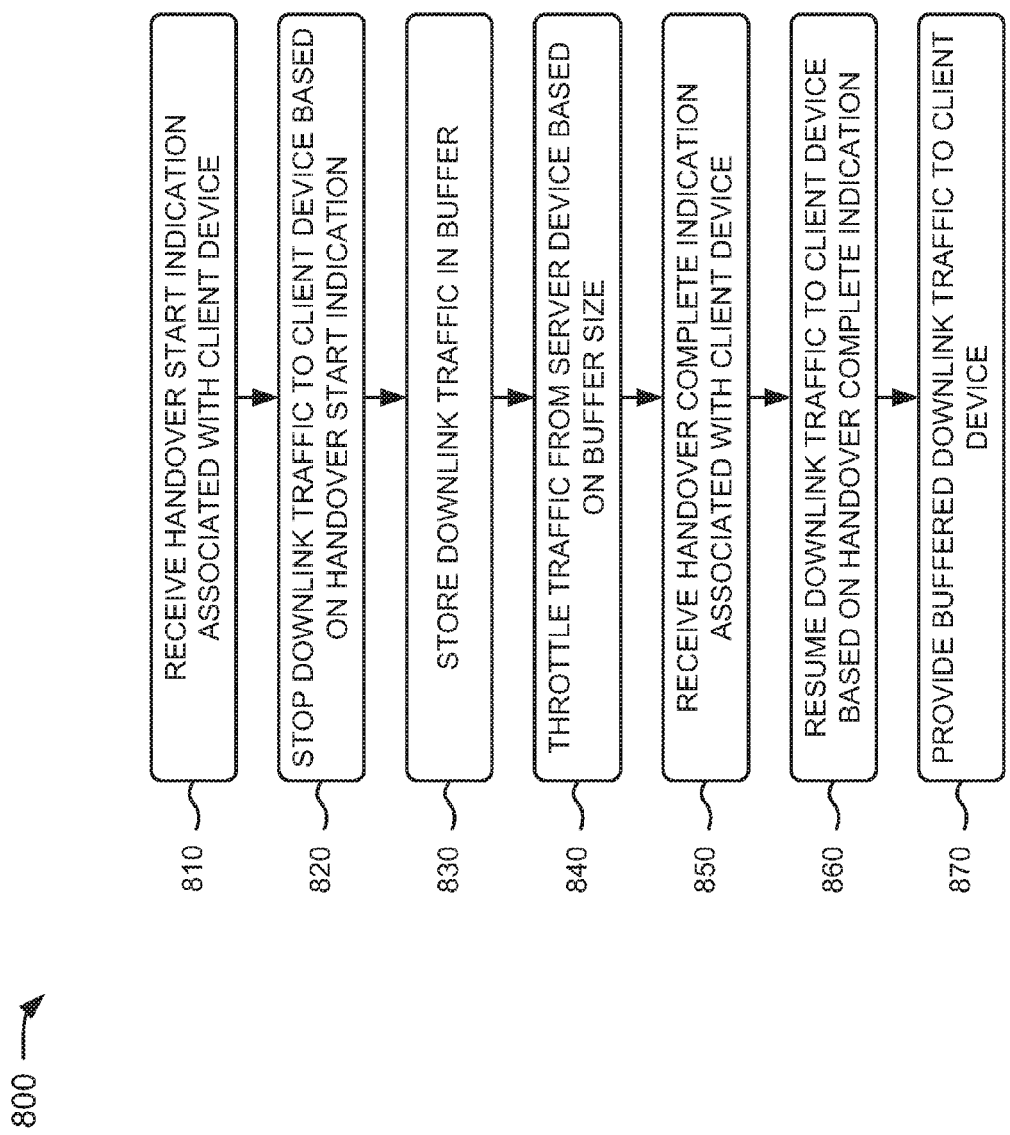

TRANSMISSION CONTROL PROTOCOL (TCP) THROUGHPUT OPTIMIZATION IN MOBILE WIRELESS NETWORKS

CROSS REFERENCE TO RELATED APPLICATIONS

This application is a continuation of U.S. patent application Ser. No. 13/179,241 on Jul. 8, 2011, the disclosure of which is hereby incorporated herein by reference in its entirety.

BACKGROUND

As wireless network data rates improve using third generation (3G), fourth generation (4G), and WiFi technologies, more and more bandwidth-intensive applications are being developed. A 4G wireless network is an all Internet protocol (IP) wireless access network in which different advanced multimedia application services (e.g., voice over IP (VoIP) content, video content, etc.) are delivered over IP.

The transmission control protocol (TCP) was originally designed for slow wired networks where no packet loss was expected. The TCP is now used to deliver a large portion of Internet protocol (IP) content over mobile wireless access networks. Any packet loss in a TCP-based network is treated as network congestion and results in a sender (e.g., a device transmitting packets) reducing a rate at which packets are sent. Furthermore, in TCP-based networks, a sender transmits packets at a faster rate if the sender detects, via TCP Acknowledgment (Ack) packets, that a receiver (e.g., a device receiving packets) is receiving packets at a faster rate. A TCP Ack packet is a packet used in the TCP to acknowledge receipt of a packet. However, mobile wireless networks utilizing the TCP encounter more packet drops and are prone to network congestion during peak hours.

BRIEF DESCRIPTION OF THE DRAWINGS

FIG. 5 is a diagram of example interactions between components of still another example portion of the network of FIG. 1;

FIG. 6 is a flow chart of an example process for providing TCP throughput optimization in mobile wireless networks according to an implementation described herein;

FIG. 7 is a flow chart of an example process for providing TCP throughput optimization based on radio conditions associated with a user device according to an implementation described herein; and FIG. 8 is a flow chart of an example process for providing TCP throughput optimization during handover and according to an implementation described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide TCP throughput optimization in mobile wireless networks. The systems and/or methods may provide a TCP proxy that handles additional wireless network latency by taking into account TCP optimization based on radio conditions of the wireless network and mobility of user devices (e.g., mobile communication devices, personal computers, set-top boxes, etc.) in the wireless network. The TCP proxy may prevent degraded throughput due to poor radio conditions and/or packet drops during handover operations.

In one example implementation, the TCP proxy may establish a first TCP connection with a client device, such as a user device, and may establish a second TCP connection with a server device. The TCP proxy may present a first TCP window size to the client device via the first TCP connection, and may present a second TCP window size to the server device via the second TCP connection. In one example, the first TCP window size may be different than the second TCP window size.

In another example implementation, the TCP proxy may establish TCP connection(s) with a client device and/or a server device, and may receive radio conditions and/or throughput associated with the client device. The TCP proxy may analyze, based on the radio conditions and/or the throughput, the TCP connection(s) with the client device, and may adjust, based on the analysis, the priorities of traffic on the TCP connection(s) with the client device. The TCP proxy may throttle traffic received from the server device when the throughput of the client device is less than a throughput of the server device.

In still another example implementation, the TCP proxy may receive a handover start indication associated with a client device, and may stop downlink traffic to the client device based on the handover start indication. The TCP proxy may store the downlink traffic in a buffer, and may throttle traffic from the server device based on a size of the buffer. The TCP proxy may receive a handover complete indication associated with the client device, and may resume the downlink traffic to the client device based on the handover complete indication. After receiving the handover complete indication, the TCP proxy may provide buffered downlink traffic to the client device.

As used herein, the term "user" is intended to be broadly interpreted to include a user device or a user of a user device. The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Figure 1:
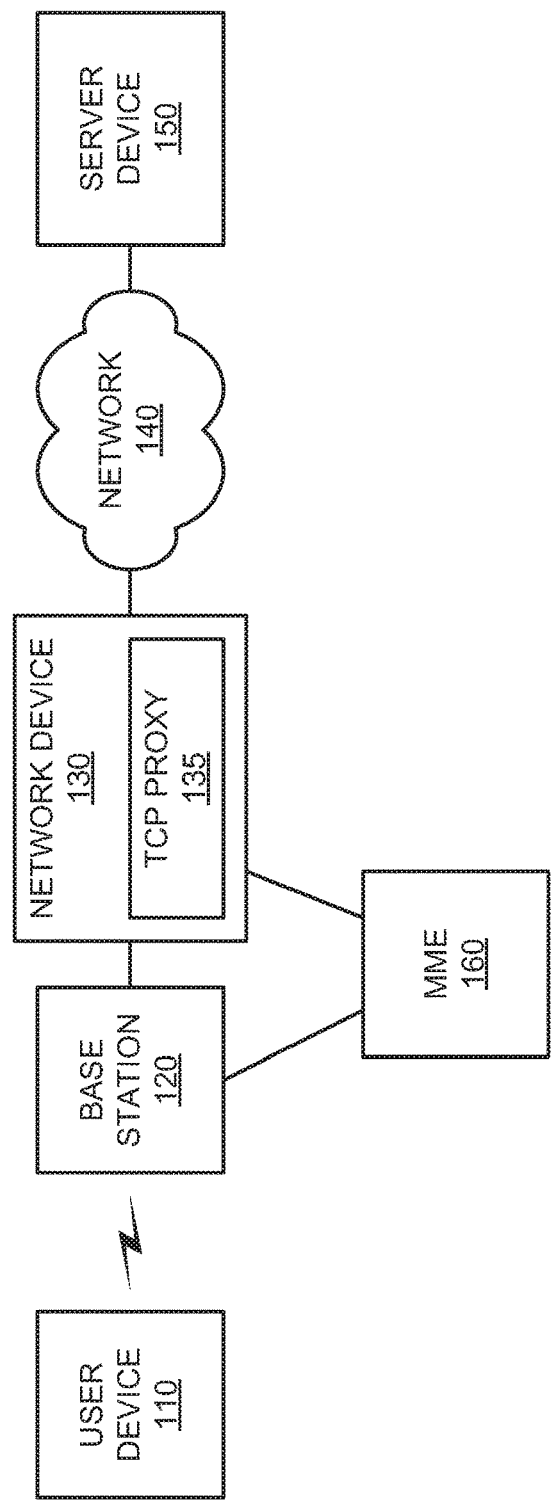
FIG. 1 is a diagram of an example network in which systems and/or methods described herein may be implemented.

FIG. 1 is a diagram of an example network 100 in which systems and/or methods described herein may be implemented. As illustrated, network 100 may include a user device 110, a base station 120, a network device 130 with a TCP proxy 135, a network 140, a server device 150, and a mobility management entity (MME) 160. Components of network 100 may interconnect via wired and/or wireless connections. A single user device 110, base station 120, network device 130, TCP proxy 135, network 140, server device 150, and MME 160 have been illustrated in FIG. 1 for simplicity. In practice, there may be more user devices 110, base stations 120, network devices 130, TCP proxies 135, networks 140, server devices 150, and/or MMEs 160. In one example implementation, components of network 100 may utilize a transmission control protocol (TCP) for delivering content (e.g., packets) to and/or from one or more other components of network 100. In other implementations, components of network 100 may utilize other protocols, such as communication protocols (e.g., the Internet protocol) associated with the Internet Protocol Suite.

User device 110 may include any device that is capable of communicating with server device 150 via a wireless access network (e.g., provided by base station 120 and/or network device 130). For example, user device 110 may include a mobile computation and/or communication device, such as a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smart phone, a laptop computer (e.g., with a wireless air card), a tablet computer, a global positioning system (GPS) device, a content recording device (e.g., a camera, a video camera, etc.), etc. In another example, user device 110 may include a fixed (e.g., provided in a particular location, such as within a customer's home) computation and/or communication device, such as a laptop computer, a personal computer, a set-top box (STB), a television, a gaming system, etc.

Base station 120 may include one or more computation and/or communication devices that receive voice and/or data (e.g., video content, file transfer protocol (FTP) uploads/downloads, etc.) from server device 150 (e.g., via network device 130 and network 140) and wirelessly transmit that voice and/or data to user device 110. Base station 120 may also include one or more devices that wirelessly receive voice and/or data (e.g., a request for video content, a FTP request, etc.) from user device 110 and transmit that voice and/or data to server device 150 (e.g., via network device 130 and network 140). In one example, base station 120 may correspond to an eNodeB device.

Network device 130 may include one or more traffic transfer devices, such as a gateway, a router, a switch, a firewall, a network interface card (NIC), a hub, a bridge, a proxy server, an optical add-drop multiplexer (OADM), or some other type of device that processes and/or transfers traffic. In one example, network device 130 may include a mobile wireless gateway that provides a convergence point between wireless protocols (e.g., associated with user device 110 and/or base station 120) and IP protocols (e.g., associated with network 140 and/or server device 150). The mobile wireless gateway may route packets (or portions of packets) from a wireless network (e.g., user device 110 and base station 120) to another network (e.g., network 140). The mobile wireless gateway may combine functions of a wireless access point, a router, and a firewall, and may be referred to as a "converged device." In one implementation, network device 130 may receive requests for content from user device 110 (e.g., via base station 120), and may provide the requests for content to server device 150 (e.g., via network 140). Network device 130 may receive the requested content from server device 150, and may provide the content to user device 110 (e.g., via base station 120).

TCP proxy 135 may include hardware or a combination of hardware and software provided in network device 130. In one example implementation, TCP proxy 135 may provide TCP throughput optimization for network 100. TCP proxy 135 may handle network 100 latency by taking into account TCP optimization based on radio conditions of a wireless network (e.g., provided by base station 120) and based on the mobility of user device 110. TCP proxy 135 may prevent degraded throughput of network 100 due to poor radio conditions and/or packet drops during handover operations. Further details of network device 130 and/or TCP proxy 135 are provided below in connection with one or more of FIGS. 2-5.

In one example, base station 120 and/or network device 130 may provide a wireless access network for user device 110. The wireless access network, in one implementation, may correspond to a 4G network, a Long Term Evolution (LTE) network, an advanced LTE network, etc. The LTE network may include a communications network that connects subscribers (e.g., user device 110) to a service provider (e.g., server device 150). In another implementation, the wireless access network may include a WiFi network or other access networks (e.g., an enhanced high-rate packet data (eHRPD) network or a WiMax network). In still other implementations, base station 120 and/or network device 130 may provide a wireless network for user device 110.

Network 140 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Server device 150 may include one or more server devices, or other types of computation or communication devices, that gather, process, search, and/or provide information in a manner described herein. In one implementation, server device 150 may include a computer system, an application, a cable head-end, and/or a broadcasting device capable of providing video content (e.g., video on demand (VOD) content, high definition (HD)-VOD content, TV programming, movies, on-demand services, live television, etc.), commercials, advertisements, instructions, voice content (e.g., voice over IP (VoIP)), and/or other information to user device 110.

MME 160 may include one or more server devices, or other types of computation or communication devices, that gather, process, search, and/or provide information in a manner described herein. MME 160 may be responsible for idle mode tracking and paging procedures (e.g., including retransmissions) for user device 110. MME 160 may be involved in a bearer activation/deactivation process (e.g., for user device 110) and may choose a SGW for user device 110 at an initial attach and at a time of intra-access network handover. MME 160 may authenticate user device 110 (e.g., via interaction with a home subscriber server (HSS), not shown). Non-access stratum (NAS) signaling may terminate at MME 160 and MME 160 may generate and allocate temporary identities to user devices (e.g., user device 110). MME 160 may check authorization of user device 110 to camp on a service provider's Public Land Mobile Network (PLMN) and may enforce roaming restrictions for user device 110. MME 160 may be a termination point in network 100 for ciphering/integrity protection for NAS signaling and may handle security key management.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
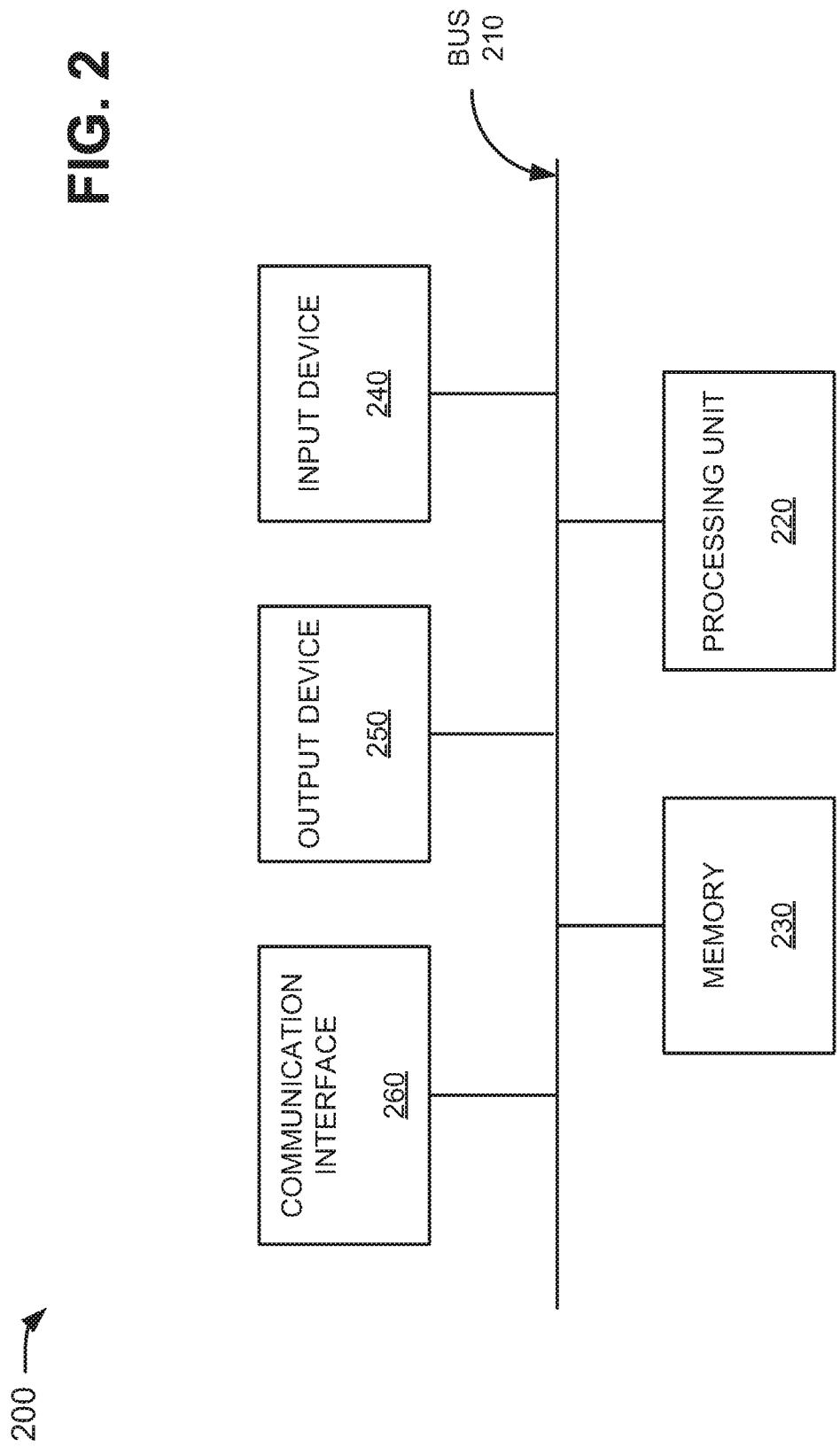
FIG. 2 is a diagram of example components of one or more of the devices of the network depicted in FIG. 1.

FIG. 2 is a diagram of example components of a device 200 that may correspond to one of the devices of network 100. In one implementation, one or more devices of network 100 may include one or more devices 200. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 360 may include mechanisms for communicating with other devices, such as other devices of network 100.

As described herein, device 200 may perform certain operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
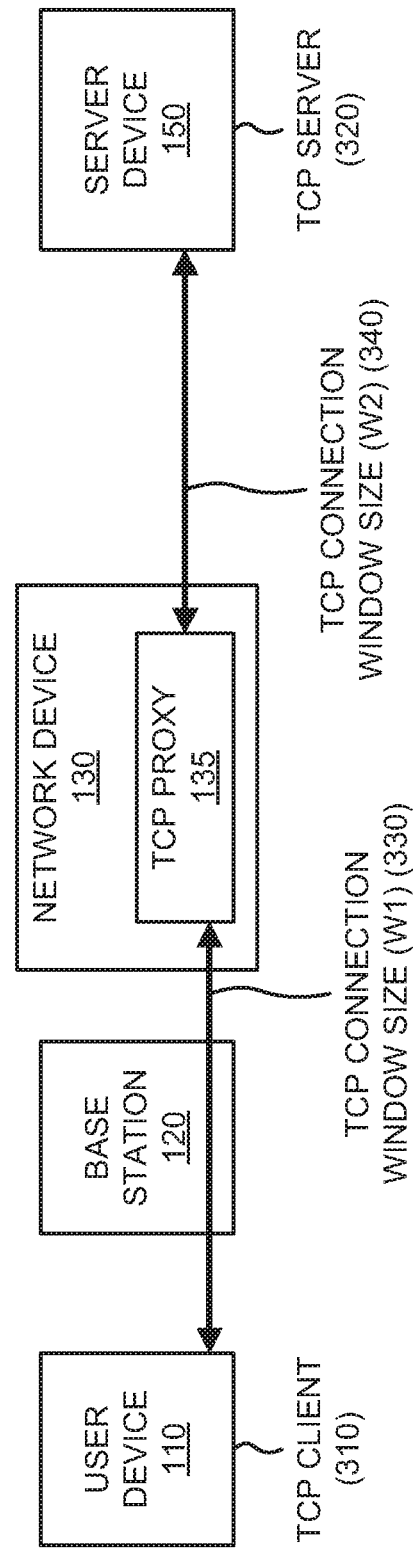
FIG. 3 is a diagram of example interactions between components of an example portion of the network illustrated in FIG. 1.

FIG. 3 is a diagram of example interactions between components of an example portion 300 of network 100. As illustrated, example network portion 300 may include user device 110, base station 120, network device 130, TCP proxy 135, and server device 150. User device 110, base station 120, network device 130, TCP proxy 135, and server device 150 may include the features described above in connection with, for example, one or more of FIGS. 1 and 2.

As further shown in FIG. 3, a user (not shown) of user device 110 may wish to establish a connection with server device 150 in order to, for example, retrieve content from server device 150, access a service provided by server device 150, etc. In such a scenario, user device 110 may correspond to a TCP client 310 and server device 150 may correspond to a TCP server 320. In order to connect TCP client 310 and TCP server 320, TCP proxy 135 may establish a TCP connection 330 with TCP client 310 (e.g., user device 110), and may establish another TCP connection 340 with TCP server 320 (e.g., server device 150).

In one example implementation, TCP proxy 135 may provide changing TCP window sizes between TCP client 310 and TCP server 320. A TCP window size may control a flow of traffic between TCP client 310 and TCP server 320, and may be a particular value (e.g., between two bytes and 65,535 bytes). As further shown in FIG. 3, TCP proxy 135 may provide a first TCP window size (W1) to TCP client 310, via TCP connection 330, and may provide a second TCP window size (W2) to TCP server 320, via TCP connection 340. In one example, the first TCP window size (W1) may be the same as or different from the second TCP window size (W2). By changing TCP window sizes between TCP client 310 and TCP server 320, TCP proxy 135 may control the flow of traffic to and/or from TCP client 310 and TCP server 320 so that user device 110 and/or server device 150 do not experience congestion or packet loss.

Although FIG. 3 shows example components of network portion 300, in other implementations, network portion 300 may include fewer components, different components, differently arranged components, and/or additional components than depicted in FIG. 3. Alternatively, or additionally, one or more components of network portion 300 may perform one or more other tasks described as being performed by one or more other components of network portion 300.

Figure 4:
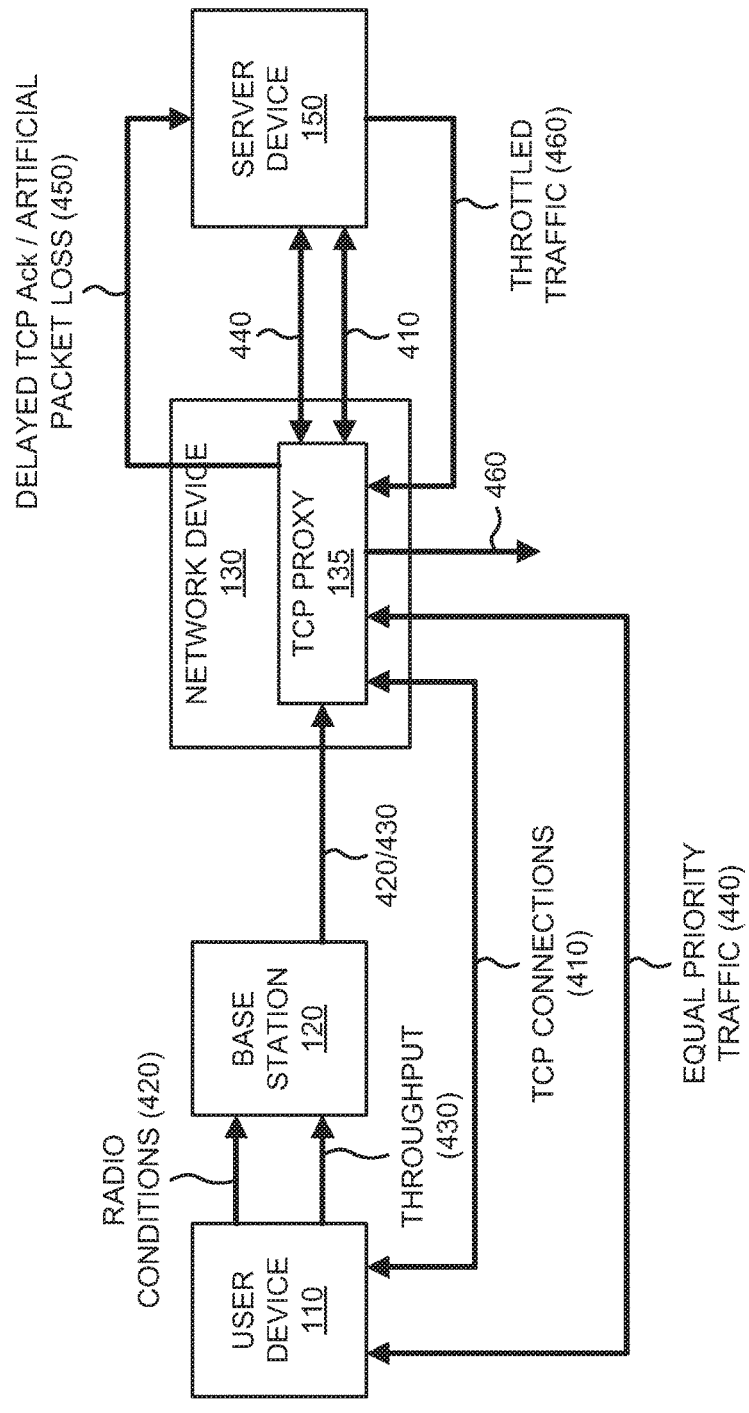
FIG. 4 is a diagram of example interactions between components of another example portion of the network depicted in FIG. 1.

FIG. 4 is a diagram of example interactions between components of another example portion 400 of network 100. As illustrated, example network portion 400 may include user device 110, base station 120, network device 130, TCP proxy 135, and server device 150. User device 110, base station 120, network device 130, TCP proxy 135, and server device 150 may include the features described above in connection with, for example, one or more of FIGS. 1-3.

As further shown in FIG. 4, a user (not shown) of user device 110 may wish to establish a connection with server device 150 in order to, for example, retrieve content from server device 150, access a service provided by server device 150, upload data to server device 150, etc. In one example, TCP proxy 135 may establish multiple TCP connections 410 for user device 110. For example, user device 110 may be executing multiple applications (e.g., an email application, a browser application, an instant messaging application, etc.), and each application may open one or more TCP connections. As further shown in FIG. 4, TCP proxy 135 may also establish multiple TCP connections 410 with server device 150.

Once TCP connections 410 are established and traffic transfer is occurring, base station 120 may continuously monitor radio conditions 420 and/or a throughput 430 associated with user device 110. Radio conditions 420 may include bandwidth available to user device 110, frequencies or channels available to user device 110, load applied by user device 110 on base station 120, etc. Throughput 430 may include a rate (e.g., in megabits per second) at which user device 110 is receiving traffic. Base station 120 may periodically report radio conditions 420 and/or throughput 430 to TCP proxy 135 of network device 130.

TCP proxy 135 may analyze, based on radio conditions 420 and/or throughput 430, TCP connections 410 with user device 110. Based on the analysis, TCP proxy 135 may adjust sending traffic on TCP connections 410. For example, TCP proxy 135 may provide the same priority to all traffic being sent on TCP connections 410, as indicated by reference number 440. Such an arrangement may ensure that one application executing on user device 110 does not receive more bandwidth than other applications executing on user device 110, which may prevent packet loss for the applications.

TCP proxy 135 may determine, based on the analysis of TCP connections 410, whether throughput of user device 110 is less than a throughput associated with server device 150. If TCP proxy 135 determines that throughput 430 of user device 110 is less than the throughput associated with server device 150, TCP proxy 135 may throttle traffic coming from server device 150. In one example implementation, TCP proxy 135 may throttle traffic coming from server device 150 by delaying TCP Acknowledgment (TCP Ack) packets provided by TCP proxy 135 to server device 150, as indicated by reference number 450. A TCP Ack packet is a packet used in the TCP to acknowledge receipt of a packet. In another example implementation, TCP proxy 135 may throttle traffic coming from server device 150 by reporting an artificial packet loss to server device 150, as further indicated by reference number 450. The delayed TCP Ack packets and/or the reporting of the artificial packet loss may cause server device 150 to slow down or throttle traffic provided by server device 150 to TCP proxy 135, as indicated by reference number 460. TCP proxy 135 may receive throttled traffic 460 from server device 150, and may provide throttled traffic 460 to user device 110.

Although FIG. 4 shows example components of network portion 400, in other implementations, network portion 400 may include fewer components, different components, differently arranged components, and/or additional components than depicted in FIG. 4. Alternatively, or additionally, one or more components of network portion 400 may perform one or more other tasks described as being performed by one or more other components of network portion 400.

FIG. 5 is a diagram of example interactions between components of still another example portion 500 of network 100. As illustrated, example network portion 500 may include user device 110, base station 120, network device 130, TCP proxy 135, server device 150, and MME 160. User device 110, base station 120, network device 130, TCP proxy 135, server device 150, and MME 160 may include the features described above in connection with, for example, one or more of FIGS. 1-4.

As further shown in FIG. 5, a user (not shown) of user device 110 may wish to establish connections with server device 150 in order to, for example, retrieve content from server device 150, access a service provided by server device 150, upload data to server device 150, etc. In order to establish connections with server device 150, user device 110 may need to perform a handover (HO) 510 with base station 120. The term "handover" may refer to a process of transferring an ongoing call or data session from one channel to another channel of a network (e.g., that includes base station 120, MME 160, and network device 130). A handover may interrupt service for user device 110 for a particular time period. For example, a handover interruption time may last up to three-hundred (300) milliseconds, depending on network node (e.g., MME 160) relocations.

When user device 110 begins handover 510, base station 120 may provide handover 510 to MME 160.

MME 160 may monitor handover scenarios for user device 110 and base station 120, and at the start of handover 510 may provide an indication 520, of the start of handover 510, to TCP proxy 135. Indication 520 may include information associated with handover 510, such as an identifier (e.g., a mobile identification number (MIN), a mobile equipment identifier (MEID), etc.) associated with user device 110. TCP proxy 135 may receive indication 520 from MME 160, and may analyze, based on indication 520, TCP connections 530 for user device 110. In one example, TCP proxy 135 may establish multiple TCP connections 530 for user device 110. For example, user device 110 may be executing multiple applications, and each application may open one or more TCP connections. As further shown in FIG. 5, TCP proxy 135 may also establish multiple TCP connections 530 with server device 150.

Based on indication 520 and/or the analysis of TCP connections 530, TCP proxy 135 may stop sending downlink traffic (e.g., traffic sent to user device 110), as indicated by reference number 540, and may store the downlink traffic in a buffer associated with network device 130. The buffer may be sized to accommodate an amount of downlink traffic that may be received by TCP proxy 135 during a handover interruption time (e.g., less than three-hundred (300) milliseconds). In one example implementation, the size of the buffer may be configured by network device 130 and/or MME 160.

Depending on the size of the buffer, TCP proxy 135 may throttle traffic coming from server device 150. In one example implementation, TCP proxy 135 may throttle traffic coming from server device 150 by delaying TCP Ack packets provided by TCP proxy 135 to server device 150, as indicated by reference number 550. In another example implementation, TCP proxy 135 may throttle traffic coming from server device 150 by reporting an artificial packet loss to server device 150, as further indicated by reference number 550. The delayed TCP Ack packets and/or the reporting of the artificial packet loss may cause server device 150 to slow down or throttle traffic provided by server device 150 to TCP proxy 135, as indicated by reference number 560. TCP proxy 135 may receive throttled traffic 560 from server device 150, and may store throttled traffic 560 in the buffer associated with network device 130.

After completion of handover 510 with user device 110, MME 160 may provide an indication 570, of completion of handover 510, to TCP proxy 135. Indication 570 may include information associated with handover 510, such as, for example, an identifier (e.g., a MIN, a MEID, etc.) associated with user device 110. Based on indication 570, TCP proxy 135 may resume sending downlink traffic to user device 110, as indicated by reference number 580. In one example implementation, TCP proxy 135 may send, to user device 110, the downlink traffic and/or throttled traffic 560 stored in the buffer associated with network device 130.

Although FIG. 5 shows example components of network portion 500, in other implementations, network portion 500 may include fewer components, different components, differently arranged components, and/or additional components than depicted in FIG. 5. Alternatively, or additionally, one or more components of network portion 500 may perform one or more other tasks described as being performed by one or more other components of network portion 500.

FIG. 6 is a flow chart of an example process 600 for providing TCP throughput optimization in mobile wireless networks according to an implementation described herein. In one implementation, process 600 may be performed by network device 130 via TCP proxy 135. In another implementation, some or all of process 600 may be performed by another device or group of devices, including or excluding network device 130 and/or TCP proxy 135.

As illustrated in FIG. 6, process 600 may include establishing a first TCP connection with a client device (block 610), and establishing a second TCP connection with a server device (block 620). For example, in an implementation described above in connection with FIG. 3, a user of user device 110 may wish to establish a connection with server device 150 in order to, for example, retrieve content from server device 150, access a service provided by server device 150, etc. In such a scenario, user device 110 may correspond to TCP client 310 and server device 150 may correspond to TCP server 320. In order to connect TCP client 310 and TCP server 320, TCP proxy 135 may establish TCP connection 330 with TCP client 310 (e.g., user device 110), and may establish another TCP connection 340 with TCP server 320 (e.g., server device 150).

As further shown in FIG. 6, process 600 may include presenting a first TCP window size to the client device via the first TCP connection (block 630), and presenting a second TCP window size to the server device via the second TCP connection, where the first TCP window size is different than the second TCP window size (block 640). For example, in an implementation described above in connection with FIG. 3, TCP proxy 135 may provide changing TCP window sizes between TCP client 310 and TCP server 320. TCP proxy 135 may provide a first TCP window size (W1) to TCP client 310, via TCP connection 330, and may provide a second TCP window size (W2) to TCP server 320, via TCP connection 340. In one example, the first TCP window size (W1) may be the same as or different from the second TCP window size (W2). By changing TCP window sizes between TCP client 310 and TCP server 320, TCP proxy 135 may control the flow of traffic to and/or from TCP client 310 and TCP server 320 so that user device 110 and/or server device 150 do not experience congestion or packet loss.

FIG. 7 is a flow chart of an example process 700 for providing TCP throughput optimization based on radio conditions associated with a user device according to an implementation described herein. In one implementation, process 700 may be performed by network device 130 via TCP proxy 135. In another implementation, some or all of process 700 may be performed by another device or group of devices, including or excluding network device 130 and/or TCP proxy 135.

As illustrated in FIG. 7, process 700 may include establishing TCP connection(s) with a client device and a server device (block 710), and receiving radio conditions and/or throughput associated with the client device (block 720). For example, in an implementation described above in connection with FIG. 4, TCP proxy 135 may establish multiple TCP connections 410 for user device 110. In one example, user device 110 may be executing multiple applications (e.g., an email application, a browser application, an instant messaging application, etc.), and each application may open one or more TCP connections. TCP proxy 135 may also establish multiple TCP connections 410 with server device 150. Once TCP connections 410 are established and traffic transfer is occurring, base station 120 may continuously monitor radio conditions 420 and/or throughput 430 associated with user device 110. Radio conditions 420 may include bandwidth available to user device 110, frequencies or channels available to user device 110, load applied by user device 110 on base station 120, etc. Throughput 430 may include a rate (e.g., in megabits per second) at which user device 110 is receiving traffic. Base station 120 may periodically report radio conditions 420 and/or throughput 430 to TCP proxy 135 of network device 130.

As further shown in FIG. 7, process 700 may include analyzing, based on the radio conditions and/or the throughput, the TCP connection(s) with the client device (block 730), and adjusting, based on the analysis, a priority of traffic provided on the TCP connection(s) with the client device (block 740). For example, in an implementation described above in connection with FIG. 4, TCP proxy 135 may analyze, based on radio conditions 420 and/or throughput 430, TCP connections 410 with user device 110. Based on the analysis, TCP proxy 135 may adjust sending traffic on TCP connections 410. For example, TCP proxy 135 may provide the same priority to all traffic being sent on TCP connections 410, as indicated by reference number 440. Such an arrangement may ensure that one application executing on user device 110 does not receive more bandwidth than other applications executing on user device 110, which may prevent packet loss for the applications.

Returning to FIG. 7, process 700 may include throttling traffic from the server device when the throughput of the client device is less than a throughput of the server device (block 750). For example, in an implementation described above in connection with FIG. 4, if TCP proxy 135 determines, based on the analysis, that throughput 430 of user device 110 is less than a throughput associated with server device 150, TCP proxy 135 may throttle traffic coming from server device 150. In one example, TCP proxy 135 may throttle traffic coming from server device 150 by delaying TCP Ack packets provided by TCP proxy 135 to server device 150, as indicated by reference number 450. In another example, TCP proxy 135 may throttle traffic coming from server device 150 by reporting an artificial packet loss to server device 150, as further indicated by reference number 450. The delayed TCP Ack packets and/or the reporting of the artificial packet loss may cause server device 150 to slow down or throttle traffic provided by server device 150 to TCP proxy 135, as indicated by reference number 460. TCP proxy 135 may receive throttled traffic 460 from server device 150, and may provide throttled traffic 460 to user device 110.

FIG. 8 is a flow chart of an example process 800 for providing TCP throughput optimization during handover and according to an implementation described herein. In one implementation, process 800 may be performed by network device 130 via TCP proxy 135. In another implementation, some or all of process 800 may be performed by another device or group of devices, including or excluding network device 130 and/or TCP proxy 135.

As illustrated in FIG. 8, process 800 may include receiving a handover start indication associated with a client device (block 810), and stopping downlink traffic to the client device based on the handover start indication (block 820). For example, in an implementation described above in connection with FIG. 5, in order to establish connections with server device 150, user device 110 may need to perform handover (HO) 510 with base station 120. When user device 110 begins handover 510, base station 120 may provide handover 510 to MME 160. MME 160 may monitor handover scenarios for user device 110 and base station 120, and at the start of handover 510 may provide indication 520, of the start of handover 510, to TCP proxy 135. Indication 520 may include information associated with handover 510, such as an identifier (e.g., a MIN, a MEID, etc.) associated with user device 110. TCP proxy 135 may receive indication 520 from MME 160, and may analyze, based on indication 520, TCP connections 530 for user device 110. Based on indication 520 and/or the analysis of TCP connections 530, TCP proxy 135 may stop sending downlink traffic (e.g., traffic sent to user device 110), as indicated by reference number 540.

As further shown in FIG. 8, process 800 may include storing the downlink traffic in a buffer (block 830), and throttling traffic from a server device based on a size of the buffer (block 840). For example, in an implementation described above in connection with FIG. 5, TCP proxy 135 may store the downlink traffic in a buffer associated with network device 130. The buffer may be sized to accommodate an amount of downlink traffic that may be received by TCP proxy 135 during a handover interruption time (e.g., less than three-hundred (300) milliseconds). Depending on the size of the buffer, TCP proxy 135 may throttle traffic coming from server device 150. In one example, TCP proxy 135 may throttle traffic coming from server device 150 by delaying TCP Ack packets provided by TCP proxy 135 to server device 150, as indicated by reference number 550. In another example, TCP proxy 135 may throttle traffic coming from server device 150 by reporting an artificial packet loss to server device 150, as further indicated by reference number 550. The delayed TCP Ack packets and/or the reporting of the artificial packet loss may cause server device 150 to slow down or throttle traffic provided by server device 150 to TCP proxy 135, as indicated by reference number 560.

Returning to FIG. 8, process 800 may include receiving a handover complete indication associated with the client device (block 850), resuming the downlink traffic to the client device based on the handover complete indication (block 860), and providing the buffered downlink traffic to the client device (block 870). For example, in an implementation described above in connection with FIG. 5, after completion of handover 510 with user device 110, MME 160 may provide indication 570, of completion of handover 510, to TCP proxy 135. Indication 570 may include information associated with handover 510, such as, for example, an identifier (e.g., a MIN, a MEID, etc.) associated with user device 110. Based on indication 570, TCP proxy 135 may resume sending downlink traffic to user device 110, as indicated by reference number 580. In one example implementation, TCP proxy 135 may send, to user device 110, the downlink traffic and/or throttled traffic 560 stored in the buffer associated with network device 130.

Systems and/or methods described herein may provide TCP throughput optimization in mobile wireless networks. The systems and/or methods may provide a TCP proxy that handles additional wireless network latency by taking into account TCP optimization based on radio conditions of the wireless network and mobility of user devices (e.g., mobile communication devices, personal computers, set-top boxes, etc.) in the wireless network. The TCP proxy may prevent degraded throughput due to poor radio conditions and/or packet drops during handover operations.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, by a device, a first indication of starting handover associated with a client device of a wireless network;
   stopping, by the device, downlink traffic to the client device based on the first indication, wherein the downlink traffic includes traffic to be sent to the client device;
   storing the downlink traffic, received from a server device of the wireless network, in a buffer associated with the device;
   receiving, by the device, a second indication of completing the handover associated with the client device; and
   resuming, by the device, the downlink traffic to the client device based on the second indication.

2. The method of claim 1, further comprising:
   providing the downlink traffic, stored in the buffer, to the client device when the second indication is received.

3. The method of claim 1, further comprising:
   throttling the downlink traffic received from the server device based on a size of the buffer.

4. The method of claim 3, wherein throttling the downlink traffic received from the server device includes:
   delaying transmission of transmission control protocol (TCP) acknowledgment packets to the server device, wherein the delayed transmission of the TCP acknowledgment packets causes the server device to decrease transmission of the downlink traffic.

5. The method of claim 3, wherein throttling the downlink traffic received from the server device includes:

reporting artificial packet loss to the server device, wherein the artificial packet loss causes the server device to decrease transmission of the downlink traffic.

6. The method of claim 1, further comprising:
establishing multiple TCP connections with the client device, based on the first indication.

7. The method of claim 6, further comprising:
providing, by the device, a first TCP window size to the client device via a first TCP connection among the multiple TCP connections; and
providing, by the device, a second TCP window size to the client device via a second TCP connection among the multiple TCP connections,
wherein the first TCP window size controls a flow of traffic between the client device and the device, and the second TCP window size controls a flow of traffic between the server device and the device.

8. The method of claim 7, wherein the first TCP window size is different than the second TCP window size.

9. The method of claim 1, wherein the handover is performed with a base station.

10. The method of claim 9, further comprising providing the handover from the base station to a mobility management entity device allocated between the client device and the device.

11. A device, comprising:
a memory to store a plurality of instructions; and
a processor to execute instructions in the memory to:
receive a first indication of starting handover associated with a client device of a wireless network,
stop downlink traffic to the client device based on the first indication, wherein the downlink traffic includes traffic to be sent to the client device,
store the downlink traffic, received from a server device of the wireless network, in a buffer associated with the memory,
receive a second indication of completing the handover associated with the client device, and
resume the downlink traffic to the client device based on the second indication.

12. The device of claim 11, wherein the processor is further to execute instructions in the memory to:
provide the downlink traffic, stored in the buffer, to the client device when the second indication is received.

13. The device of claim 11, wherein the processor is further to execute instructions in the memory to:
throttle the downlink traffic received from the server device based on a size of the buffer.

14. The device of claim 13, wherein, when throttling the downlink traffic received from the server device, the processor is further to execute instructions in the memory to:
delay transmission of transmission control protocol (TCP) acknowledgment packets to the server device, wherein the delayed transmission of the TCP acknowledgment packets causes the server device to decrease transmission of the downlink traffic.

15. The device of claim 13, wherein, when throttling the downlink traffic received from the server device, the processor is further to execute instructions in the memory to:
report artificial packet loss to the server device, wherein the artificial packet loss causes the server device to decrease transmission of the downlink traffic.

16. The device of claim 11, wherein the processor is further to execute instructions in the memory to:
establish multiple TCP connections with the client device, based on the first indication.

17. The device of claim 16, wherein the processor is further to execute instructions in the memory to:
provide, by the device, a first TCP window size to the client device via a first TCP connection among the multiple TCP connections; and
provide, by the device, a second TCP window size to the client device via a second TCP connection among the multiple TCP connections,
wherein the first TCP window size controls a flow of traffic between the client device and the device, and the second TCP window size controls a flow of traffic between the server device and the device.

18. The device of claim 17, wherein the first TCP window size is different than the second TCP window size.

19. The device of claim 11, wherein the handover is performed with a base station.

20. The device of claim 19, wherein the processor is further to execute instructions in the memory to:
provide the handover from the base station to a mobility management entity device allocated between the client device and the device.

* * * * *